Patented Aug. 22, 1944

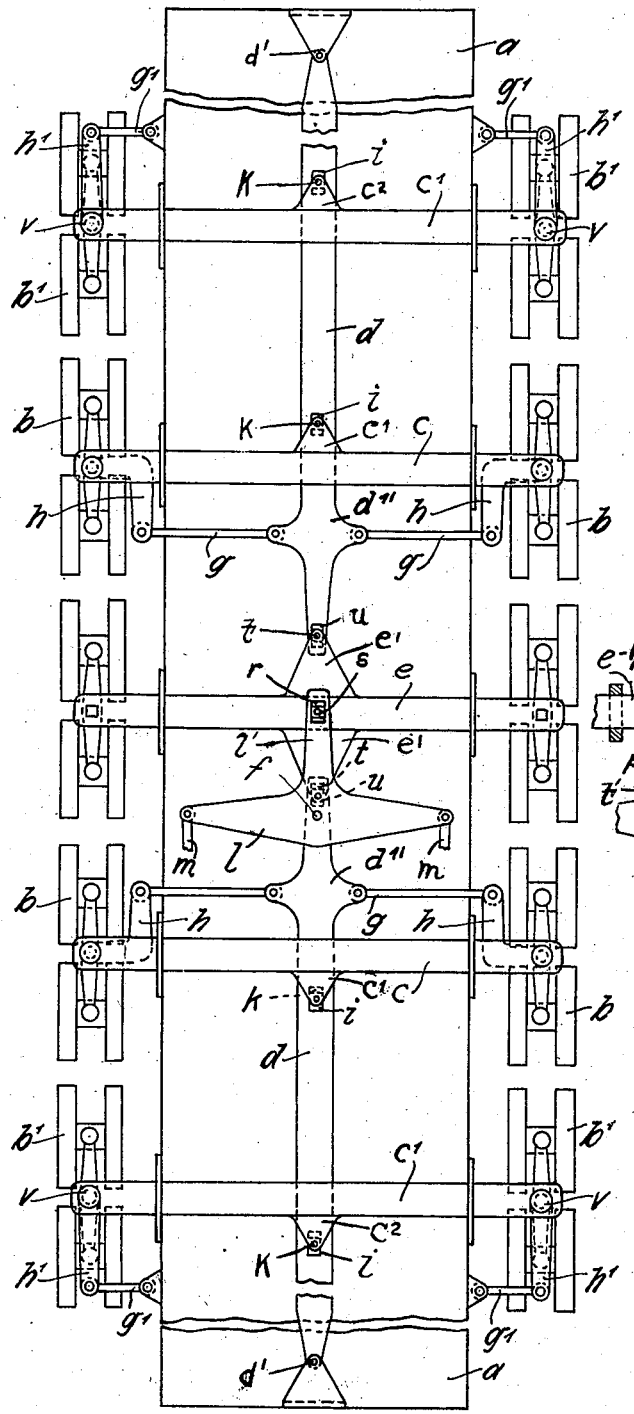

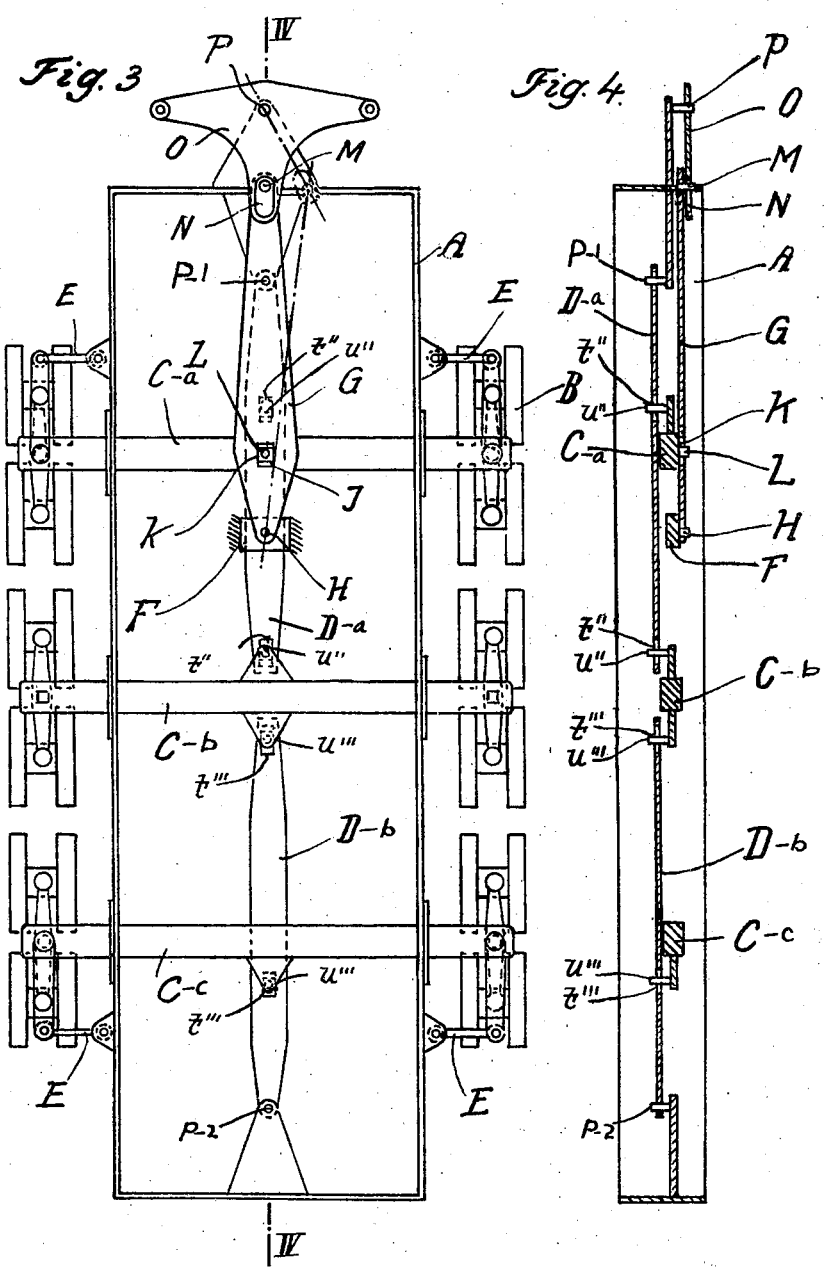

2,356,528

UNITED STATES PATENT OFFICE 2,356,528

STEERING FOR TRACK CHAIN AND OTHER VEHICLES HAVING MORE THAN TWO AXLES

Bodo Mette, Berlin-Halensee, Germany; vested in the Alien Property Custodian

Application October 24, 1940, Serial No. 362,505
In Germany September 12, 1938

9 Claims. (Cl. 280—87)

This invention relates to motor vehicles with more than two axles, especially track chain vehicles with carrier wheels or sets of carrier wheels arranged on carrier axles which are capable of lateral displacement, the wheels being supported by the track chain and adapted to be rocked according to the displacement of the axles, when the vehicle is steered. The invention concerns more particularly an arrangement for carrying out the individual movements, whereby trains can be made of several track chain vehicles which are coupled the one to the other and the vehicles can be steered in such a manner that they follow the track.

As compared with the known arrangements the steering gear of the present invention has the substantial advantage that its construction is comparatively simple and accessible and breakdowns, which might otherwise be caused, for instance, by distortion of the chassis, are avoided. Moreover the parts used for displacement are light; they are well protected and do not undergo appreciable wear and the force required for displacing the gear members is not considerable, as the surfaces which are subjected to friction or sliding movements are reduced to a minimum.

Several embodiments of a steering gear for a track chain vehicle with three and five displaceable axles are shown diagrammatically by way of example in the accompanying drawings, in which:

Fig. 1 is a plan view of the steering gear of a track chain vehicle with five displaceable axles, Fig. 2 shows in part plan view the middle axle which is capable of being shortened, Fig. 3 is a plan of a modification of the construction shown in Fig. 1, and Fig. 4 is a longitudinal section along IV—IV of Fig. 3.

As illustrated in Fig. 1 applicant's device consists of the following elements:

The chassis $a$ has mounted on it the middle axle $e$ and two sets of forward and rear axles $c$ and $c'$. These axles $c$, $c'$ and $e$ are so mounted in the chassis $a$ as to be endwise slidable therein. An operating lever $l$ is pivoted to the chassis $a$ by a pin $f$ and has a tongue $l'$ which has a slot and pin connection $r$ and $s$ with the middle axle $e$.

The two levers $d$ are pivoted to the chassis $a$ at its ends, respectively, by pins $d'$. The ends $d''$ of the levers $d$, adjacent the middle axle $e$ have slot and pin connections $t$ and $u$ with ears $e'$ on each side of the middle axle $e$, respectively. Each lever $d$ has slot and pin connections $i$ and $k$ with ears $c—1$ and $c—2$ on the axles $c$ and $c'$.

The above described structure functions to effect the endwise movement of the axles $c$, $c'$ and $e$, in the following manner:

When the lever $l$ is rocked by its towing rods $m$ from the steering gear (not shown), it shifts the axle $e$ through the slot and pin connections $r$ and $s$ therewith. The shifting of the axle $e$ moves the levers $d$ through its ears $e'$ and slot and pin connections $t$ and $u$ on the ends of the levers $d$. The movement of the levers $d$ shifts the axles $c$ and $c'$ through the slot and pin connection $i$ and $k$ on ears $c—1$ and $c—2$ of the axles $c$ and $c'$ and the levers $d$.

The sets of wheels on the ends of the middle axle $e$ are not rocked. The mechanism whereby the sets of wheels on the ends of the axles $c$ and $c'$ are rocked will now be explained. These sets of wheels are mounted on vertical rotatable shafts $v$ which are journaled in the ends of the axles $c$ and $c'$. The shafts $v$ on axles $c$ have bell crank arms $h$ with pivoted links $g$ connected with the levers $d$. When the levers $d$ are moved, the shafts $v$ are rocked through the links $g$ and crank arms $h$ thus rocking the sets of wheels on axles $c$. The shafts $v$ on axles $c'$ have crank arms $h'$ with pivoted links $g'$ connected with the chassis $a$. When the axles $c'$ are shifted the shafts $v$ being moved relative to the chassis $a$ are rocked through crank arms $h'$ and links $g'$ thus rocking the sets of wheels on axles $c'$.

Fig. 2 illustrates a modified form of means for connecting the operating lever $l$ and levers $d$ with the middle axle when it comprises two portions. This form consists of the following elements:

The middle axle comprises the two aligned portions $e—1$ and $e—2$ endwise slidable in the chassis $a$. The lever $l$ pivoted to chassis $a$ has a tongue $l''$ with lateral ears $o$ having slot and pin connections $n$ and $p$ with the inner ends of the axle portions $e—1$ and $e—2$ respectively. The ends $d'''$ of levers $d$ adjacent the axle portions $e—1$ and $e—2$ are connected to the ends of a plate $q$ by slot and pin connections $t'$ and $u'$. The plate $q$ is also connected at its middle with the tongue $l''$ of lever $l$ by a slot and pin connection $r'$ and $s'$.

The above described structure, illustrated in Fig. 2, functions to effect the endwise movement of the middle axle $e$ and through movement of levers $d$ the endwise movement of axles $c$ and $c'$ in the following manner:

When the lever $l$ is rocked, as above explained, the portions e—1 and e—2 are shifted through the operation of the ears o on the tongue l" of lever l and the slot and pin connection n and p with the portions e—1 and e—2, and also the plate q is shifted by the slot and pin connection r' and s' between the tongue l" of lever l and the plate q. This shifting of plate q moves the levers d through the slot and pin connection t' and u' between the ends d''' of the levers d and the ends of the plate q thereby shifting the axles c and c' through their connection with levers d as shown in Fig. 1.

Figs. 3 and 4 illustrate another modified form of means for connecting an operating lever O and the levers D—a and D—b with the axles C—a, C—b, C—c. This form consists of the following elements:

These axles C—a, C—b and C—c (forward, middle and rear) are endwise slidable in the chassis A and carry on their ends sets of wheels B. The operating lever O is pivoted on the pin P on the forward end of the chassis A. The lever G is pivoted on a cross beam F of the chassis A by pivot pin H, and has a slot and pin connection N and M with the lever O and a slot and pin connection K and J—L with the forward axle C—a. The lever D—a, at the forward end of the chassis A is pivoted on pin P—1 on chassis A at the forward ends of chassis A and the lever D—a, and has slot and pin connection t'' and u'' with the forward and middle axles C—a and C—b (see Fig. 4). The lever D—b, at the rear end of chassis A is pivoted to the chassis A on the pin P—2, at the rear end of chassis A and the lever D—b and has slot and pin connection t''' and u''' with the middle and rear axles C—b and C—c.

The above described structure, illustrated in Figs. 3 and 4, functions to effect the endwise movement of the forward axle C—a and through movement of levers D—a and D—b and endwise movement of the middle and rear axles C—b and C—c in the following manner:

When the operating lever O is rocked, as above explained, it moves the lever G, through the slot and pin connection N and M. This movement of lever G shifts the forward axle C—a through the slot and pin connection K and J—L. The shifting of the forward axle C—a moves the forward lever D—a through the slot and pin connection t'' and u'' between the forward axle C—a and the forward lever D—a (see Fig. 4). The movement of the forward lever D—a shifts the middle axle C—b through the slot and pin connection t'' and u'' between the forward lever D—a and the middle axle C—b. The shifting of the middle axle C—b moves the rear lever D—b through the slot and pin connection t''' and u''' between the middle axle C—b and the rear lever D—b. The movement of the rear lever D—b shifts the rear axle C—c through the slot and pin connection t''' and u''' between the rear lever D—b and the rear axle C—c. The sets of wheels B on the ends of the middle axle C—b are not rocked. The mechanism for rocking the sets of wheels B on the forward and rear axles C—a and C—c, illustrated in Fig. 3, is identical with that illustration in Fig. 1, for the sets of wheels b' on the ends of the forward and rear axles c'.

I claim:

1. In a steering device for a vehicle having more than two endwise slidable axles, the combination of a pair of oscillatable members pivoted on said vehicle, operatively connected with, and adapted to slide all but one of said axles, and to be oscillated by the sliding of the said remaining axle; and an oscillatable member pivoted on said vehicle and adapted to slide the said remaining axle which is operatively connected with said pair and adapted to actuate said pair of members and cause them to slide the other axles.

2. In a steering device for a vehicle having more than two endwise slidable axles; oscillatable means pivoted on said vehicle and operatively connected with and adapted to slide one of said axles; means adapted to actuate said means; and oscillatable means pivoted on said vehicle and adapted to be oscillated by said first mentioned oscillatable means and operatively connected with and adapted to slide the remaining axles.

3. In a steering device for a vehicle having more than two endwise slidable axles, oscillatable means pivoted on said vehicle and operatively connected with and adapted to slide one of said axles; means adapted to actuate said means; and oscillatable means pivoted on said vehicle and operatively connected with all the axles and adapted to be oscillated by the sliding of said one axle to slide the remaining axles.

4. In a steering device for a vehicle having three or more endwise slidable axles, the combination of a pair of oscillatable members pivoted at the front and rear ends of the vehicle respectively, and having longitudinal axes normally lying in the longitudinal axis of the vehicle, said members having slot and pin connections with the axle located at the middle of the vehicle; means adapted to slide one of said axles, the sliding of said axle actuating the said oscillatable members to cause them to slide the other axles.

5. In a steering device for a vehicle having more than two endwise slidable axles, the combination of an operating lever pivoted to the vehicle and having a slot and pin connection with one of the vehicle axles; a pair of levers pivoted to said vehicle, and having slot and pin connections with the said axle, one of said last mentioned levers having a slot and pin connection with each of the axles forward of said axle and the other of said levers having slot and pin connection with the axles behind said axle.

6. In a steering device for a vehicle having more than two endwise slidable axles, one of said axles consisting of two aligned portions, the combination of an operating lever having a slot and pin connection with each of said portions, a pair of levers pivoted on said vehicle; a connecting medium on which each of said last mentioned levers is pivoted and having a slot and pin connection with said operating lever, one of said last mentioned levers having slot and pin connection with the axles forward of said axle, and the other of said last mentioned levers having slot and pin connection with the axles behind said axle.

7. In a steering device for a vehicle having more than two endwise slidable axles, the combination of an operating lever pivoted to the vehicle; a lever pivoted to said vehicle and having slot and pin connections with said operating lever and the front axle of the vehicle; and a pair of levers pivoted to said vehicle, one of said last mentioned levers having slot and pin connection with the said front axle and an axle behind said front axle, and the other of said last mentioned levers having slot and pin connection with said last mentioned axle and such other axles as may be behind said last mentioned axle.

8. In a steering device according to claim 7, in which all the axles, except the axle with which both of said levers are connected, are provided with rockable sets of wheels, journaled in the ends of the axles, a crank on the journal of each set and a link pivotally connecting said crank with said vehicle, so that the journaled sets are rocked correspondingly with the sliding of the axles by the oscillatable members.

9. In a steering device according to claim 5, in which the axle with which the operating lever is connected is placed between at least two axles in front and at least two axles behind it; and all the axles except the said middle axle are provided with rockable sets of wheels, journaled in the ends of the axles; a bell crank on the journal of each set on the ends of the axles adjacent the middle axle, a link pivotally connecting said crank with one of said pivoted levers, a crank on the journal of each set on the ends of the axles forward and behind the last mentioned axles, and a link pivotally connecting said last mentioned crank with said vehicle, so that the journaled sets are rocked correspondingly with the sliding of the axles by the pivoted levers.

BODO METTE.